June 28, 1955  D. J. RUTERBORIES  2,711,865
COMBINATION AUTOMATIC AND SPINNING REEL
Filed June 8, 1953  3 Sheets-Sheet 1

INVENTOR.
Darrell J. Ruterbories
BY
Martin E Anderson
ATTORNEY

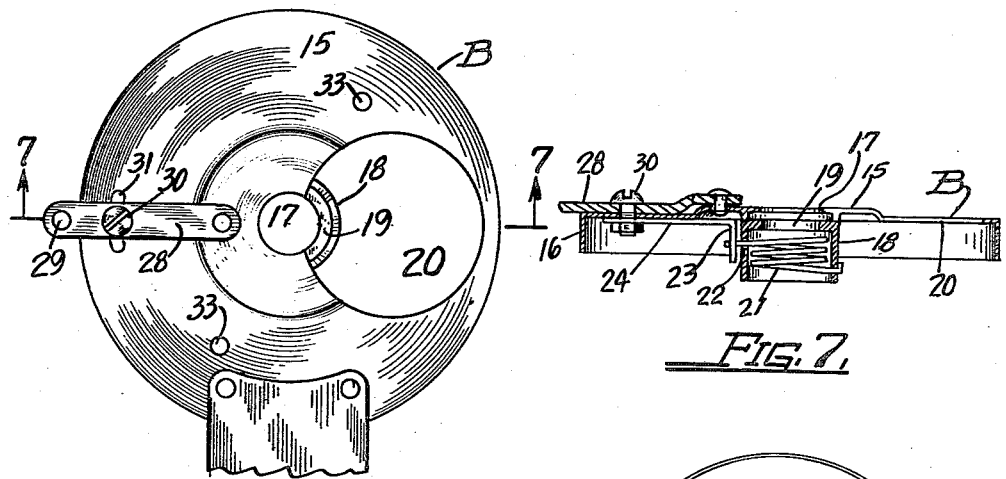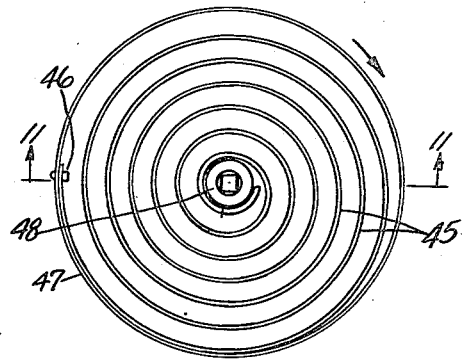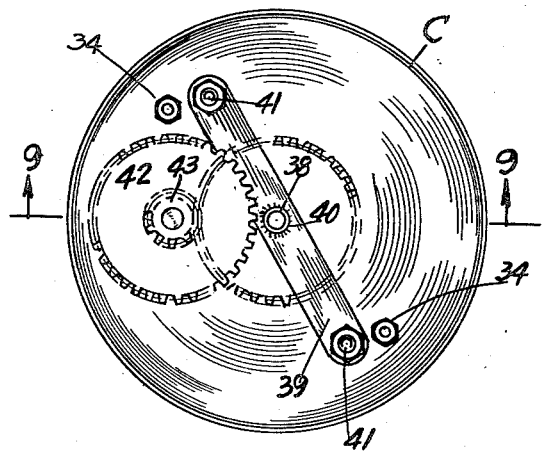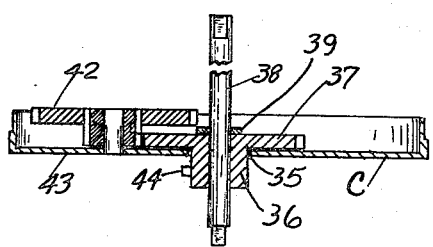

June 28, 1955    D. J. RUTERBORIES    2,711,865
COMBINATION AUTOMATIC AND SPINNING REEL
Filed June 8, 1953    3 Sheets-Sheet 3
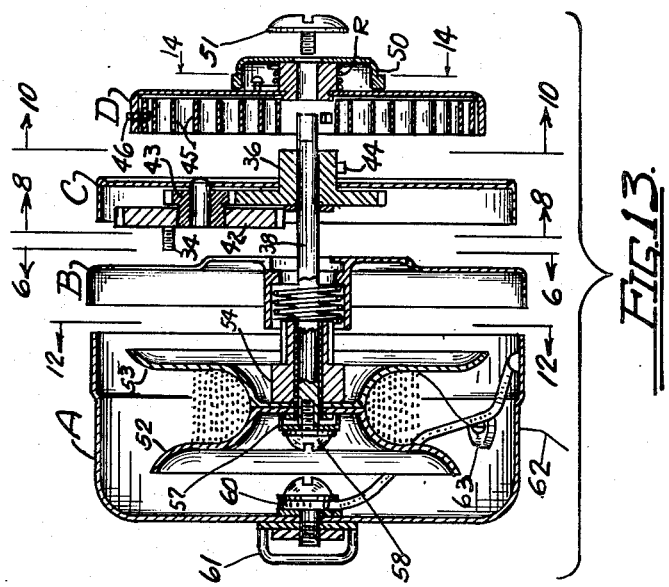
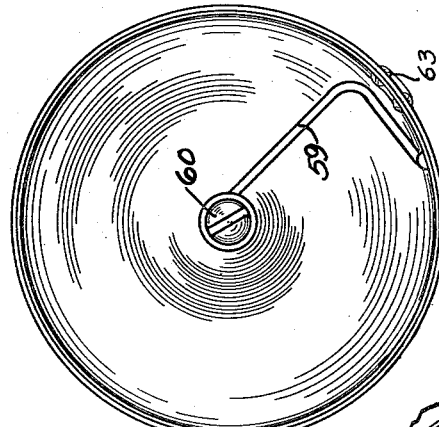
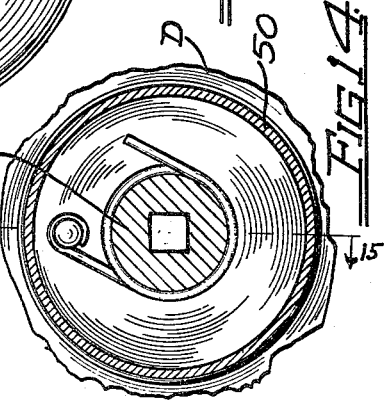
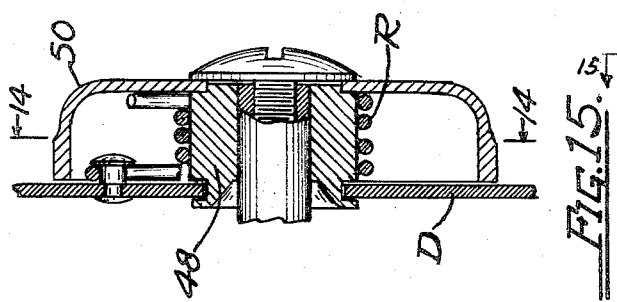
INVENTOR.
Darrell J. Ruterbories
BY
Martin E. Anderson
ATTORNEY United States Patent Office 2,711,865
Patented June 28, 1955

2,711,865
COMBINATION AUTOMATIC AND SPINNING REEL

Darrell J. Ruterbories, Lakewood, Colo.

Application June 8, 1953, Serial No. 360,165

2 Claims. (Cl. 242—84.3)

This invention relates to improvements in fishing reels and has reference more particularly to a reel provided with a spring for reeling the line onto the spool, a brake for controlling the rotation of the spool and means for changing the direction of the line takeoff so that it flows over the edge of the spool during the casting operation.

In order to make a long cast it is necessary to reduce the amount of friction that the line encounters to a minimum, which is effected by various means which lets the line pull from the spool by flowing over one edge of the stationary spool.

After the fish has been hooked it is frequently a long hard task to land it during which time the line is unwound from the rotating spool and the spring is wound by the tension exerted on the line by the fish. The reel itself due to the action of the spring maintains the line taut, and the fisherman by manipulation of the brake can control the tension in the line.

In order to explain the invention in such a manner that the structure and the mode of operation of the reel can be readily understood reference will be had for this purpose to the accompanying drawing in which the invention has been illustrated and in which:

Figure 6 is a rear elevational view of the part shown in Figure 5, looking through plane 6—6, in Figure 13;

Figure 7 is a section taken on line 7—7, Figure 6;

Figure 8 is a front elevational view of the part designated by C in Figure 1 and is taken looking through plane 8—8, Figure 13;

Figure 9 is a diametrical section taken on line 9—9, Figure 8;

Figure 10 is a front elevation view of the spring housing designated by D in Figure 2 looking through plane 10—10, Figure 13;

Figure 11 is a diametrical section taken on line 11—11, Figure 10;

Figure 12 is a view looking through plane 12—12, Figure 13;

Figure 1:
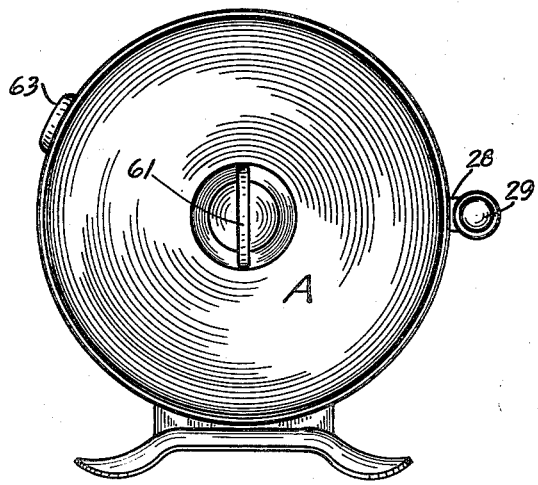
Figure 1 is a front elevational view looking toward the right in Figure 2.

Figure 13 is an exploded view showing parts A, B, C, and D in diametrical section and in their relative positions, Figure 14 is a section taken on lines 14—14, Figures 15 and 13, and Figure 15 is a section taken on line 15—15, Figure 14.

Referring now to the drawing. It will be seen from Figures 2 and 13 that the reel comprises four separable sections designated for identification by letters A, B, C and D each of which has been separately shown and will now be described in detail. Part B which is most clearly shown in Figures 6 and 7 consists of a circular disk 15 having an encircling flange 16 provided with a central opening 17 surrounded on the front side by a cylindrical hub 18 provided with an annular flange 19 whose opening is the same size as opening 17. The circular part 15 is also provided with a large opening 20 that intersects opening 17 the purpose of which will hereinafter appear.

Figure 5:
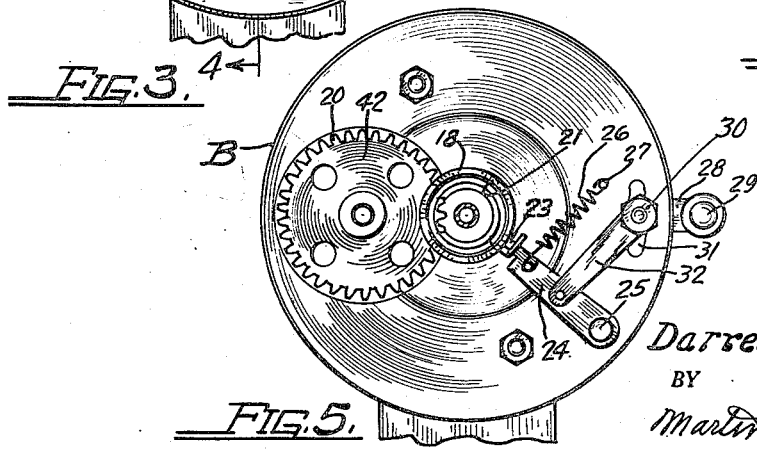
Figure 5 is an elevational view showing the parts when the spool has been removed from Figure 3.

Positioned within hub 18 is a helical spring 21 which has one end anchored to the hub and the other end projecting through a slot 22 and anchored to a projection 23 on lever 24 which is pivoted at 25 as shown most clearly in Figure 5. A tension spring 26 has one end attached to lever 24 and the other end anchored at 27 and exerts a force that tends to remove any expanding pressure from spring 21 which, as will hereinafter be explained serves as a brake for the winding drum or spool. Pivoted to part 15 and positioned on the rear thereof is a brake lever 28 whose handle has been designated by numeral 29. A bolt 30 is rigidly attached to lever 28 and projects through the arcuate slot 31. A link 32 connects bolt 30 with lever 24 and provides an interconnection that enables the operator to expand the brake helix 21 and release the brake whenever he desires to effect an operation that will presently be described.

Figure 2:
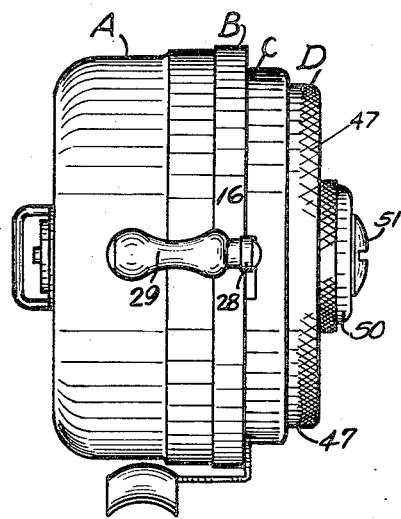
Figure 2 is a side elevation looking toward the left in Figure 1.

The part designated by C is positioned adjacent part B and to the right thereof when viewed as in Figures 2 and 13. Part B has two holes 33 and part C has two bolts 34 that enter holes 33 when the parts are assembled and serve to hold parts B and C in assembled relation. Part C has a central opening 35 Figure 9 in which hub 36 is journaled. Hub 36 is part of gear 37 and has an axial opening for shaft 38. A bar 39 has an opening that receives shaft 38 which is welded thereto as indicated at 40. Bar 39 is attached to part C by two bolts 41. Gear 42 carries a laterally extending pinion 43 that meshes with gear 37 and when B and C are connected to each other in concentric relation, gear 42 intersects opening 17 in part B.

Hub 36 has a projection 44 that engages an opening in the end of the innermost coil of spring 45 whose outermost coil is attached by a rivet 46 or other means to flange 47 of the spring case D as shown most clearly in Figures 10 and 11. A short hub 48 which is provided with a non-circular opening 49, is attached to the outside of case D and concealed by cap 50. The spring case D is positioned at the right of part C as shown in Figures 2 and 13 and hub 36 extends into the innermost loop of spring 45 and projection 44 engages an opening in the end of the spring as before mentioned. A screw 51 has threaded engagement with the end of shaft 38 when the latter is positioned in hub 48 and holds the parts in assembled relation. Shaft 38 does not turn because it is soldered or welded to bar 39, as indicated at 40 in Figure 8, and its function is to hold the parts in assembled relation.

Figure 3:
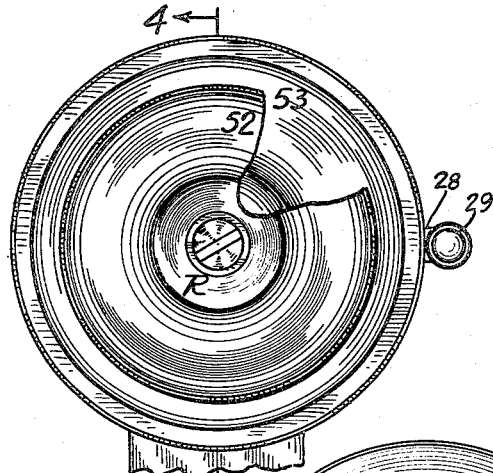
Figure 3 is a front elevational view with the part A removed and shows the spool a portion of one side of which has been broken away.
Figure 4:
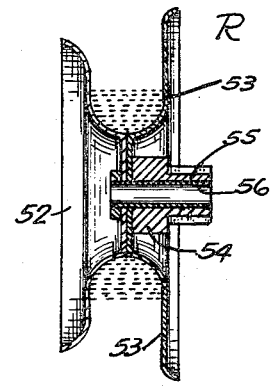
Figure 4 is a diametrical section through the spool taken on line 4—4, Figure 3.

The reel or spool R which is shown in Figures 3 and 4, consists of two parts 52 and 53 whose shape is clearly shown in Figures 3 and 4. The two parts are held in assembled position and secured to brake drum 54 and pinion 55 by a tubular rivet 56 that receives shaft 38 which serves as a journal for the spool. When the spool is moved into operative position relative to part B the brake drum will be positioned in the brake helix and since part C is then in operative position relative to part B the teeth of pinion 55 will be in mesh with gear 42 which intersects opening 17. A washer 57 and nut 58 holds the spool in operative position. Bolts 34 secure part C to part B and screw 51 holds the spring case in operative position.

The removable cap A telescopes into the flange 16 of part B and carries a bent steel or bronze wire 59 one end of which is attached to a rotatable assembly 60 located in the center of cap A directly above the axis of rotation of the spool, and which has a finger grip loop 61 by means of which it can be rotated. The wire is bent as shown in Figures 12 and 13 so that it will extend from the center of cap A outwardly over the edge of part 52 of the spool thence downwardly and outwardly with its free end terminating at a point adjacent the wall of the cap opposite part 53 of the spool. The fish line 62 passes over the wire and out through grommet 63 as shown in Figure 13. When the wire is turned in a direction to move the lower end towards the observer (clockwise in Fig. 12) the line will move upward along the wire until it comes to a position above the spool adjacent assembly 60; whereupon, the line will leave the spool at an angle of approximately 90° to that shown in Figure 13 by flowing over the edge of part 52 while the spool remains stationary before passing out of the cap through grommet 63. There is very little resistance to the flow of the line in the manner described and this position is used for casting. When wire 59 is turned in the opposite direction the line will return to the position shown in Figure 13 and can then be unwound only when the spool turns.

Operation

Having now described the structure of the various elements we will assume that the several parts, A, B, C and D are brought together as shown in Figure 2. A reference to Figure 13 will show that hub 36 which is then positioned within the innermost loop of spring 45, is operatively attached to the spring by lug 44. Brake drum 54 is positioned in the brake helix 21 and pinion 55 is in mesh with gear 42. When spring case D to which the outer end of spring 45 is attached rotates clockwise, when viewed in Figure 2, the spring tension will tend to turn hub 36 in the same direction but the hub cannot turn unless the spool shown in Figure 4 turns and that is held from turning by the brake helix 21 which engages the drum 54. The brake helix is wound in such a direction that the friction between it and drum 54 tends to tighten the helix and therefore has a self-tightening snubbing action. Casing D is held against rotation relative to part C by a suitable ratchet or one way clutch R located in housing 50, one form of which is illustrated in Figures 14 and 15. When the fisherman releases the brake which holds the spool from turning (by moving handle downwardly Figures 2, 3 and 5), spring 45 begins to unwind and turns the spool in a direction to wind the fish line thereon. When "playing" a fish the fisherman has merely to keep the brake in inoperative position and when the tension exerted on the line by the fish is sufficient to overcome the action of spring 45 the line will unwind from the spool and this in turn will wind spring 45. The fisherman by manipulating the brake can increase the drag on the line. When the tension on the line decreases beyond a certain point the spool will be turned in a direction to wind the line thereon. The gear ratio can be quite high because the function of the spool is merely to take up the slack in the line.

What is claimed as new is:

1. An automatic fish reel comprising in combination, a housing, a spool mounted therein for rotation, a clock type spring in the housing, a gear train operatively interconnecting the spring and the spool to effect rotation of the latter by power derived exclusively from the spring, a brake drum operatively associated with the spool, a cooperating brake shoe element normally engaging the brake drum to hold the spool from rotating, means comprising a handle accessible from the outside of the housing and normally in operative engagement with said brake shoe element for releasing the spool whereby it can be rotated by the spring and a wire-like element mounted for rotation about the axis of the spool, said wire-like member having its outer end positioned to extend substantially transversely of the spool beyond the periphery thereof, forming means for shifting the path of the line to have it flow over the end of the spool for casting.

2. In an automatic fishing reel having, a housing, a spool mounted for rotation therein, a clock type spring in the housing, a gear train operatively interconnecting the spring and the spool to effect rotation of the latter by power derived exclusively from the spring, a brake drum operatively associated with the spool, a cooperating brake shoe element normally engaging the brake drum to hold the spool from rotating, and a handle accessible from the outside of the housing and normally in operative engagement with said brake shoe element for releasing the spool whereby it can be rotated by the spring, the improvement which comprises a line guide connected within the housing for rotational movement about the axis of the spool and curving outwardly and downwardly over the edge of the spool forming means for shifting the line until it flows off the spool in the direction of the axis of rotation.

References Cited in the file of this patent

UNITED STATES PATENTS 2,124,634     Russell et al. _____ July 26, 1938